United States Patent [19]

McClaran

[11] Patent Number: 5,660,198
[45] Date of Patent: Aug. 26, 1997

[54] FLOW COMPENSATED PRESSURE CONTROL SYSTEM

[75] Inventor: Mark R. McClaran, Orange, Calif.

[73] Assignee: J. C. Carter Company, Inc., Costa Mesa, Calif.

[21] Appl. No.: 576,151

[22] Filed: Dec. 21, 1995

[51] Int. Cl.⁶ .................................................. F16K 31/12
[52] U.S. Cl. ....................... 137/12; 137/10; 137/488; 137/486; 137/487.5
[58] Field of Search ..................... 137/486, 487.5, 137/487, 488, 2, 10, 12

[56] References Cited

U.S. PATENT DOCUMENTS

| | | | |
|---|---|---|---|
| 2,229,417 | 1/1941 | Mason | 137/485 |
| 2,961,586 | 11/1960 | Morrell | 137/485 |
| 3,665,945 | 5/1972 | Ottenstein | 137/487.5 |
| 4,277,832 | 7/1981 | Wong | 137/487 |
| 4,306,446 | 12/1981 | Fukuda . | |
| 4,553,216 | 11/1985 | Stevens et al. . | |
| 4,562,552 | 12/1985 | Miyoka et al. . | |
| 5,136,517 | 8/1992 | Cullen et al. . | |
| 5,142,483 | 8/1992 | Basham et al. . | |
| 5,190,068 | 3/1993 | Philbin | 137/487.5 |
| 5,255,209 | 10/1993 | Krebs . | |
| 5,315,530 | 5/1994 | Gerhardt et al. . | |
| 5,351,705 | 10/1994 | Reinders | 137/487.5 |
| 5,460,196 | 10/1995 | Yonnet | 137/487.5 |

Primary Examiner—Denise L. Ferensic
Assistant Examiner—Ramyar M. Farid
Attorney, Agent, or Firm—Kelly Bauersfeld Lowry & Kelley, LLP.

[57] ABSTRACT

A control system is provided for monitoring and regulating fluid pressure at a remote and/or potentially hazardous location along the length of a fluid flow conduit, without requiring a pressure sensor device at the remote site. The control system comprises a controller responsive to fluid pressure and flow rate readings taken at a convenient and/or safe location along the length of the flow conduit, to derive fluid pressure at the remote site. The controller provides a display of the derived pressure and/or operates a control valve at the safe site to regulate the pressure at the remote site.

2 Claims, 1 Drawing Sheet

FLOW COMPENSATED PRESSURE CONTROL SYSTEM

BACKGROUND OF THE INVENTION

This invention relates generally to pressure control systems and related methods for monitoring and regulating fluid pressure along the length of a fluid flow conduit. More particularly, this invention relates to a pressure control system and method for monitoring and/or regulating pressure at a remote and/or potentially hazardous site, without requiring pressure sensors or the like at the remote site.

In many fluid flow applications, it is necessary or desirable to monitor and/or regulate the pressure of a fluid along the length of a fluid flow conduit. In this regard, in some instances, it is particularly desirable to monitor and regulate the fluid pressure at a remote or potentially hazardous location along the flow conduit, wherein placement of a pressure sensor or other sensor device at such remote or hazardous site is either undesirable or not possible. One example of such environment is an aircraft refueling system wherein it is desirable to monitor and regulate fluid pressure at a releasible coupling adapted for connecting a fuel supply conduit to the aircraft. However, placement of a pressure sensor at or in close proximity to such releasible coupling is undesirable for various reasons, including but not limited to explosion hazards, space or access restrictions, and environmental or other handling constraints.

The present invention provides a relatively simple and reliable pressure control system for monitoring and/or regulating fluid pressure at a remote site along the length of a fluid flow conduit, based upon pressure and flow rate readings taken at a convenient and/or safe location along the flow conduit.

SUMMARY OF THE INVENTION

In accordance with the invention, a flow compensated pressure control system is provided for monitoring and regulating fluid pressure at a remote and/or potentially hazardous location along the length of a fluid flow conduit, without requiring a pressure sensor device at the remote site. The pressure control system comprises a controller which is suitably programmed to derive fluid pressure at the remote site, based upon fluid pressure and flow rate readings taken at a convenient and/or safe location along the conduit length. The controller provides a display of the derived pressure level, and/or is adapted to operate a control device such as a pressure control valve or a suitable flow rate control device in a manner regulating fluid pressure at the remote site within or in accordance with prescribed limits.

The controller is programmed for a given fluid flow application during a calibration phase, by directly measuring fluid pressure at both of the remote and safe locations, and by measuring fluid flow rate through the conduit during simulated operation. From a knowledge of these parameters, and the density of the fluid being handled, a system flow coefficient (Cv) can be calculated. The flow coefficient (Cv) is programmed into the controller and the system is placed into normal operation with the pressure sensor removed from the remote site.

During normal system operation, fluid pressure and flow rate at the safe site are monitored to enable the controller to derive fluid pressure at the remote site. The controller may be adapted further to respond to this derived pressure reading to operate a pressure control valve or the like which modulates the fluid pressure in a manner maintaining the pressure level at the remote site at or below a selected threshold or within a predetermined range.

Other features and advantages of the present invention will become more apparent from the following detailed description, taken in conjunction with the accompanying drawing which illustrates, by way of example, the principles of the invention.

BRIEF DESCRIPTION OF THE DRAWING

The accompanying drawing illustrates the invention in diagrammatic form.

DETAILED DESCRIPTION OF THE PREFERRED EMBODIMENT

Figure 1:
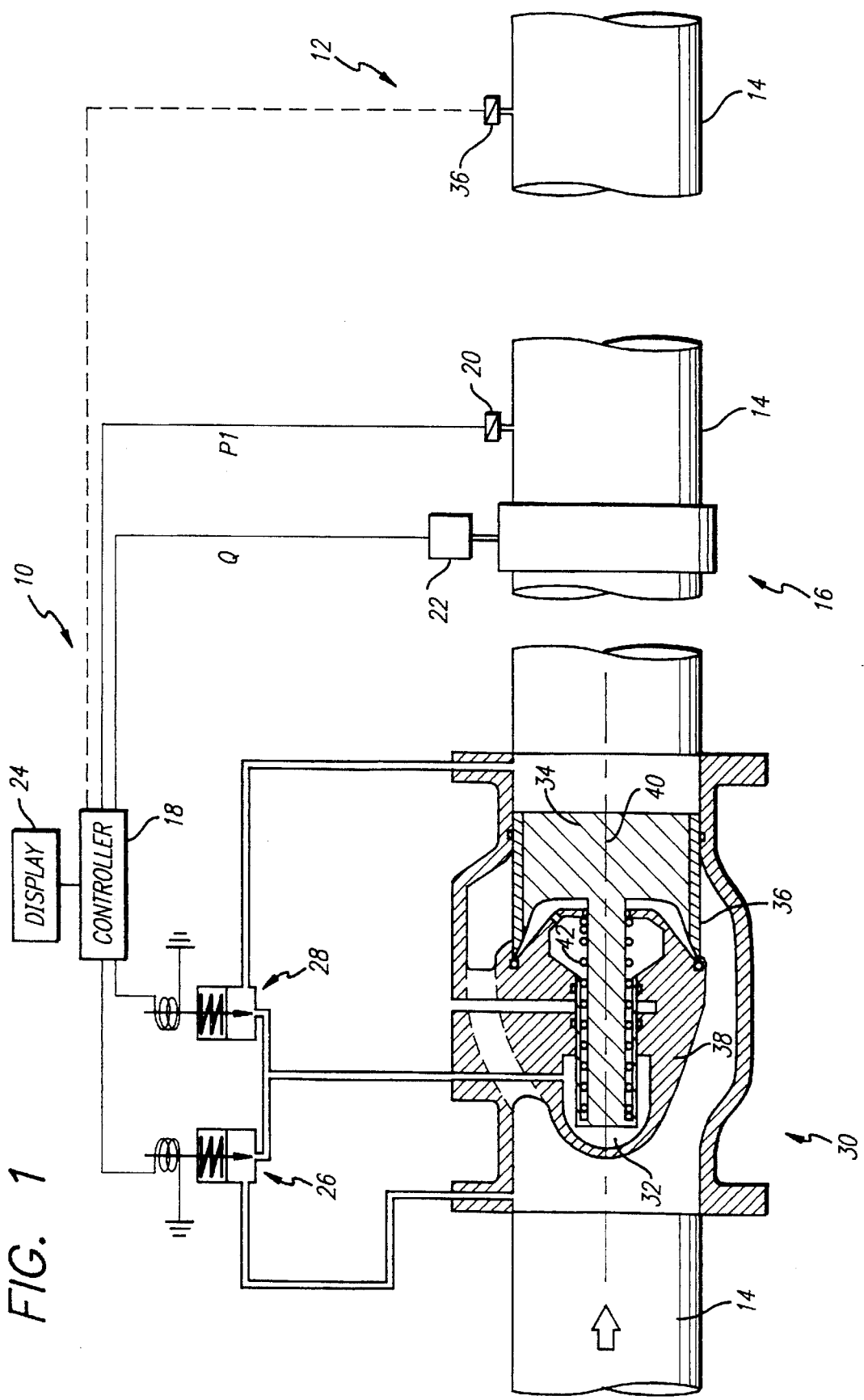

As shown in the exemplary drawing, an improved flow compensated pressure control system referred to generally by the reference numeral 10 is provided for monitoring and/or regulating fluid pressure at a remote or hazardous location 12 along the length of a fluid flow conduit 14. The control system 10 includes sensor devices and a pressure control valve 30 disposed at a convenient or safe location 16 along the length of the conduit 14, in combination with a programmable controller 18. The controller 18 is adapted for response to parameter readings that can be taken at the safe location 16, to derive an accurate indication of the fluid pressure level at the remote site 12, for monitoring and/or pressure regulation purposes.

The illustrative drawing shows the control system 10 of the present invention in an aircraft refueling application wherein the conduit 14 constitutes a fuel supply hose adapted for releasible on-the-ground or in-flight connection to an aircraft fuel system (not shown) by means of a coupling (also not shown) located at or near the remote site 12. During normal operation, placement of a sensor device, particularly one requiring electrical power, is undesirable at the remote site 12 due to explosion hazard and space constraints. However, it is highly desirable to monitor fluid pressure at the remote site 12, to permit regulation of that fluid pressure in a manner ensuring that the refueling process proceeds in a safe and proper fashion.

In operation, the controller 18 responds to parameter readings taken by the sensor devices at the safe location 16, in order to derive an indication of fluid pressure at the remote site 12 which is downstream from the safe site 16. As shown, these parameter readings include a pressure reading or signal (P1) provided by a pressure transducer 20 installed along the flow conduit 14, in addition to a fluid flow rate reading or signal (Q) taken by an appropriate flow meter 22 installed along the length of the conduit 14. The controller 18 responds to these parameters to derive the fluid pressure at the remote site 12 for appropriate display as indicated by block 24, and/or to regulate one or more solenoid operated valves 26 and 28 which control the pressure control valve 30, also located along the conduit at the convenient or safe location 16, upstream from the flow meter 22 and the pressure sensor 20. The solenoid valves 26, 28, in the illustrative drawings, are respectively coupled to the higher pressure inlet side and the lower pressure outlet side of the control valve, and are operated by the controller 18 to modulate pressure within a control chamber 32 in a manner modulating a pilot spool 34 to increase or decrease downstream side fluid pressure along the conduit 14. As shown, the pilot spool 34 has an open-webbed construction with an outer sleeve 36 having a rear edge adapted to engage a control valve body 38 to prevent flow through the control valve. A spool stem 40 extends rearwardly within the valve body 38 and a spring 42 reacts between a front wall of the valve body and rear end shoulder on the stem 40 to bias the pilot spool 34 toward the closed position as shown. The modulated pressure within the control chamber 32 partially opens the pilot spool in a manner resulting in accurate downstream pressure regulation. It will be understood by persons skilled in the art, however, that the specific construction and operation of the pressure control valve 30 may take different forms known in the art to provide the requisite flow rate control function.

The controller 18 is preprogrammed to permit derivation of fluid pressure at the remote site 12, without requiring a pressure sensing device at that location during normal operation. More specifically, there is a functional relationship for noncompressible fluid flow along the length of the conduit 14, given by the following equation:

(1):
$$P2 = P1 - \frac{Q^2}{C_v^2 \frac{62.4}{\rho}}$$

Where:
Cv=system flow coefficient
Q=flow rate, gpm.
P1=pressure at a safe location, psi.
P2=pressure at a remote location, psi.
$\rho$=the density of the flowing fluid, lbs./ft.$^3$ During an initial system calibration phase, a pressure transducer 36 is installed along the conduit 14 at the remote site 12, and fluid flow is initiated through the conduit to simulate normal operation. Equation (1) can be solved to determine the system flow coefficient (Cv), by measuring flow rate (Q), the pressures (P1) and (P2) at the safe and remote sites, respectively, and based on a knowledge of the density of the fluid handled by the system. The controller 18 is then programmed, based on knowledge of the flow coefficient (Cv) to solve equation (1) in the following form:

(2):
$$C_v = \frac{Q}{\sqrt{[P1 - P2]\frac{62.4}{\rho}}}$$

After the initial calibration phase and appropriate programming of the controller 18, the pressure transducer 36 at the remote site 12 can be removed from the system. The fluid flow system and related control system can then be placed in normal operation, with the controller 18 deriving the pressure at the remote site 12, based only on the pressure reading (P1) and flow rate reading (Q) reading from the sensors 20, 22 at the safe site 16. The derived pressure reading at the remote site 12 can be displayed by the display block 24 for visual monitoring purposes. Alternately, or in addition, the derived pressure reading can be used to operate the pressure control valve 30, as described above, in a manner regulating the fluid pressure at the remote site 12 below a predetermined threshold limit or within a predetermined range.

The above description of the invention relies on the derived pressure reading (P2) being downstream of the pressure reading (P1). Those skilled in the art can determine that the equation for the flow coefficient (Cv) can be solved for an upstream (P1) if the remote location 12 is upstream of the safe location 16 as follows:

$$P1 = P2 + \frac{Q^2}{C_v^2 \frac{62.4}{\rho}}$$

In normal operation, the controller 18 will derive the pressure (P1) at the remote location 12 based only on the pressure reading (P2) and flow rate reading (Q) reading from the sensors 20, 22 and safe location 16. Displaying the pressure reading at the remote site 12 and operation of the pressure control valve 30 would be as described above.

Another embodiment of the invention utilizes a rate of flow control device in place of the pressure control valve 30. It can be seen of equation (1) that the derived pressure reading (P2) can be effected by changing the flow rate (Q) rather than changing pressure (P1) at the safe location 16. Alternately, or in addition, the derived pressure reading can be used to operate a rate of flow control device in a manner regulating the fluid pressure at the remote site 12 below a predetermined threshold or within a predetermined range.

A variety of further modifications and improvements to the flow compensated pressure control system of the present invention will be apparent to those skilled in the art, including, but not limited to modifications for compressible fluid flow applications. Accordingly, no limitation on the invention is intended by way of the foregoing description and accompanying drawings, except as set forth in the appended claims.

What is claimed is:

1. A method of monitoring fluid pressure along the length of a fluid flow conduit, said method comprising the steps of:

detecting the fluid pressure at a first location along the flow conduit and generating a pressure signal representative thereof by means of a pressure sensor;

detecting the fluid flow rate at the first location along the flow conduit and generating a flow rate signal representative thereof by means of a flow rate sensor;

deriving the fluid pressure at a second location along the flow conduit remote and downstream from said first location by means of a controller responsive to the pressure and flow rate signals;

said deriving step comprises using said controller to solve the equation:

$P2 = P1 - (Q^2 \rho / C_v^2 * 62.4)$,

Where:

P2=derived pressure at second location

P1=detected pressure at first location

Q=detected flow rate

Cv=system flow coefficient $\rho$=fluid density;

determining the system flow coefficient (Cv) by detecting the fluid pressure and flow rate at the first location while also detecting the fluid pressure at the second location during a simulated operation calibration phase;

means to regulate the fluid pressure along the flow conduit to maintain the fluid pressure at said second location within a predetermined limit;

said means comprising a pressure control pilot valve that is mounted along the flow conduit at least slightly upstream from said first location and further including the step of operating said pressure control valve by said controller to maintain the fluid pressure at said second location within the predetermined limit.

2. The method of claim 1 further including the step of displaying the derived fluid pressure at said second location.

* * * * *